United States Patent
Schouweiler et al.

(10) Patent No.: US 10,471,377 B2
(45) Date of Patent: Nov. 12, 2019

(54) METHOD OF MAKING A THIN FILTRATION MEDIA

(71) Applicant: AHLSTROM-MUNKSJÖ OYJ, Helsinki (FI)

(72) Inventors: Kevin R. Schouweiler, Brentwood, TN (US); Kent Williamson, Madisonville, KY (US)

(73) Assignee: AHLSTROM-MUNKSJÖ OYJ, Helsinki (FI)

( * ) Notice: Subject to any disclaimer, the term of this patent is extended or adjusted under 35 U.S.C. 154(b) by 491 days.

(21) Appl. No.: 14/774,804

(22) PCT Filed: Mar. 14, 2014

(86) PCT No.: PCT/FI2014/050191
§ 371 (c)(1),
(2) Date: Sep. 11, 2015

(87) PCT Pub. No.: WO2014/140428
PCT Pub. Date: Sep. 18, 2014

(65) Prior Publication Data
US 2016/0023149 A1 Jan. 28, 2016

Related U.S. Application Data

(60) Provisional application No. 61/798,463, filed on Mar. 15, 2013, provisional application No. 61/784,719, filed on Mar. 14, 2013.

(30) Foreign Application Priority Data

Jan. 24, 2014 (WO) .................. PCT/FI2014/050058

(51) Int. Cl.
*B01D 39/18* (2006.01)
*B01D 39/16* (2006.01)
*B05D 3/00* (2006.01)

(52) U.S. Cl.
CPC .......... *B01D 39/18* (2013.01); *B01D 39/163* (2013.01); *B05D 3/007* (2013.01);
(Continued)

(58) Field of Classification Search
CPC ...................................... B01D 39/18
See application file for complete search history.

(56) References Cited

U.S. PATENT DOCUMENTS 4,241,122 A * 12/1980 Asano .................. D06N 3/0004
427/200
4,431,479 A * 2/1984 Barbe .................... D21C 9/007
162/100
(Continued)

FOREIGN PATENT DOCUMENTS

CN 1615172 A 5/2005
CN 1809408 A 7/2006
(Continued)

OTHER PUBLICATIONS

FHP-11 Product Summary, Buckeye, Mar. 8, 2013.*
(Continued)

*Primary Examiner* — Alex A Rolland
(74) *Attorney, Agent, or Firm* — Ostrager Chong Flaherty & Broitman PC

(57) ABSTRACT

A method for manufacturing a filtration media with improved filtration, strength, tear resistance and air permeability in the form of a relatively thin and lightweight wet-laid fibrous web that has a wet Mullen ratio of 20% to 90% to ensure that the media is flexible enough to be formed into a fluted structure, and strong enough to retain the fluted structure when would into a roll and to permit further processing.

22 Claims, 1 Drawing Sheet

(52) U.S. Cl.
CPC .. *B01D 2239/064* (2013.01); *B01D 2239/069* (2013.01); *B01D 2239/086* (2013.01); *B01D 2239/1216* (2013.01); *B01D 2239/1225* (2013.01); *B01D 2239/1233* (2013.01); *B01D 2239/1258* (2013.01); *B01D 2239/1291* (2013.01)

(56) References Cited

U.S. PATENT DOCUMENTS

| | | | | |
|---|---|---|---|---|
| 4,455,195 | A | * | 6/1984 | Kinsley .............. B01D 39/18 162/13 |
| 4,455,237 | A | | 6/1984 | Kinsley |
| 5,914,157 | A | | 6/1999 | Munson et al. |
| 6,133,170 | A | | 10/2000 | Suenaga et al. |
| 7,270,692 | B2 | | 9/2007 | Gillingham et al. |
| 7,303,604 | B2 | | 12/2007 | Gieseke et al. |
| 7,488,365 | B2 | | 2/2009 | Golden et al. |
| 7,959,702 | B2 | | 6/2011 | Rocklitz et al. |
| 8,236,082 | B2 | | 8/2012 | Witsch et al. |
| 8,241,383 | B2 | | 8/2012 | Schrage et al. |
| 2001/0024716 | A1 | | 9/2001 | Chen et al. |
| 2004/0221976 | A1 | * | 11/2004 | Williams .............. D21H 23/26 162/135 |
| 2006/0196359 | A1 | | 9/2006 | Gillingham et al. |
| 2008/0022645 | A1 | * | 1/2008 | Skirius .............. A47C 31/007 55/524 |
| 2009/0077938 | A1 | | 3/2009 | Kume et al. |
| 2010/0031618 | A1 | | 2/2010 | Grove, III |
| 2010/0181015 | A1 | * | 7/2010 | Kohler .............. B31F 1/285 156/210 |
| 2010/0319543 | A1 | * | 12/2010 | Witsch .............. B01D 39/163 95/273 |

FOREIGN PATENT DOCUMENTS

| | | |
|---|---|---|
| CN | 102458604 A | 5/2012 |
| CN | 102458606 A | 5/2012 |
| JP | 2012036518 | 2/2012 |
| KR | 1099377 | 12/2011 |
| KR | 20120044979 | 5/2012 |
| WO | 2009003119 | 12/2008 |
| WO | 2014144670 | 9/2014 |

OTHER PUBLICATIONS

Notice of Grounds for Rejection from the Korean Intellectual Property Office in Application No. 2015-7028234 of Ahlstrom Corporation, dated May 16, 2016.
Non-Final Office Action dated Nov. 24, 2014 in U.S. Appl. No. 13/839,915.
PCT International Search Report and Written Opinion for PCT/US2014/029179, dated Oct. 13, 2014.
PCT International Search Report for PCT/FI2014/050191, dated Jul. 3, 2014.
Buckeye Product Summary, Grade FHP-11 SBSK Wood Pulp, Mar. 8, 2013, Buckeye Technologies, Memphis, TN.
PCT International Preliminary Report on Patentability for PCT/FI2014/050193, dated May 8, 2015.
Mohamed, M et al., "Efficient Use of Fibrous Structures in Filtration", Industrial Environmental Research Laboratory, U.S. Environment Protection Agency, Research Triangle Park, NC, EPA-600/2-76-204, Jul. 1976.
PCT International Preliminary Report on Patentability for PCT/FI2014/050191, dated Jul. 1, 2015.
Final Office Action dated Aug. 13, 2015 in U.S. Appl. No. 13/839,915.
First Search Report from State Intellectual Property Office of People's Republic China in Application No. 201480014933.4 of Ahlstrom Corporation, dated Mar. 23, 2016.
PCT International Report on Patentability for PCT/US2014/029179, dated Sep. 15, 2015.
Office Action dated Feb. 21, 2018 in U.S. Appl. No. 14/774,903.

* cited by examiner

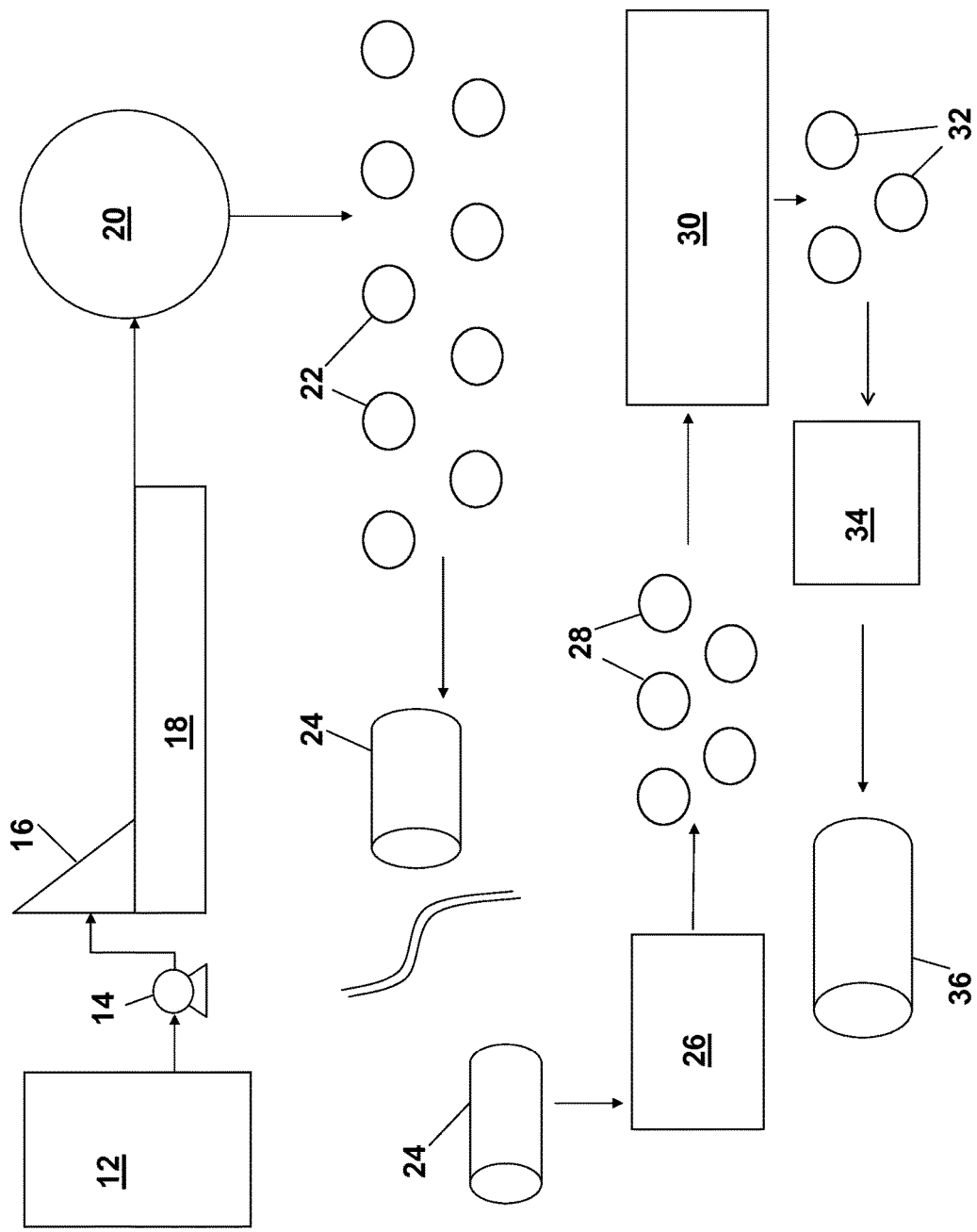

METHOD OF MAKING A THIN FILTRATION MEDIA

TECHNICAL FIELD

This disclosure relates generally to filtration and, more particularly, to methods of making thin filtration media for use in filter elements, packs or cartridges designed to remove contaminant materials from fluid streams, such as air and liquid, and methods of making such a thin filtration media.

BACKGROUND

It is quite common for fluid streams, such as air flow streams, gas streams and liquid streams, to carry contaminant materials therein. For example, fluid streams to engines, gas turbines, combustion furnaces, engine lube systems, hydraulic systems, coolant systems and fuel systems carry particulate contaminants therein that should be filtered.

Filtration media of various fiber compositions and processing methods are currently available for removing some or all contaminant materials from such fluid streams. The media are typically porous to permit fluid to flow through the media while at the same time trapping particulate contaminants in the media. In particular, a wide range of media have been developed for use in pleated filter elements, which expand the effective surface area of the media that can trap contaminant material. In addition to good particulate contaminant removal properties, suitable pleated filter media often have high strength, and preserve (or substantially preserve) the media's pleats during manufacture, storage and use.

In recent years, alternatives to pleated configurations have been developed, which incorporate a series of fluted sheets of media through which fluid flows from one flute to another as it passes from an upstream ("dirty") side of the filter element to a downstream ("clean") side of the filter element. This flow is often called "z-flow", and filters with fluted media are sometimes referred to as a "z-flow element". Example z-flow elements are disclosed in U.S. Pat. No. 8,241,383, assigned to Donaldson Company, Inc. In some z-flow constructions, the flutes are characterized by unique shapes that contain features such as sharp flute peaks and/or ridges formed in the fluted media between adjacent flute peaks.

Although media having structured flutes is desirable for many applications, much of the existing air filtration media can be difficult to form into structured flutes, and can become degraded (such as from tearing) during use as a result of vibrations, or the peaks and ridges (or other structures) in the flutes can fail to adequately retain their shape after forming and/or during use of the media.

BRIEF SUMMARY OF THE INVENTION

Therefore, a need exists for improved filtration media which can be readily formed into structured flutes without cracking or tearing, which provides a desirable level of retention of flute shapes during storage and use, and is otherwise suitable for use in filtration applications that desire media constructions having flutes with sharp peaks and ridges between peaks, as well as other formed structural elements.

The foregoing purposes, as well as others that will be apparent, are achieved by providing a specific method for manufacturing a thin and lightweight filtration media in the form of a wet-laid fibrous web. The method requires that a variable called we. Mullen ratio is defined. The wet Mullen ratio is an indicator of the percent cure of the resin in the media and this percent cure can be tailored to the downstream converter's desired processing conditions. The wet Mullen ratio applied for a filtration media depends on the final user's needs. If a filtration media, which requires no further processing or heating, (i.e. no further curing), is needed, a wet Mullen ratio of 60% to 80%, preferably 60%-75%, and more preferably 60% to 70% is appropriate to ensure that the media is flexible but strong enough to retain a fluted structure when wound into a roll and to permit further working of the media. However, if additional curing is performed during the pleating/fluting process, a lower Mullen ratio may be used. Thin filtration media having a caliper of 15 mils (0.38 mm) or less (preferably between 6 and 15 mils (0.15-0.38 mm), more preferably between 8 and 15 mils (0.20-0.38 mm), a total weight of about 35 to 45 pounds/3000 square feet (57-73 g/m$^2$), a tear resistance of at least 50 grams (490 mN) per 16 ply in the machine direction and at least 60 grams (590 mN) per 16 ply in the cross direction, and sufficiently porous to allow the appropriate permeability to fluids while maintaining resistance to undesirable contaminants can be readily obtained by this process.

Thin filtration media that achieve the foregoing properties comprise a blend of fibers having a weight percentage of 70 wt % to 92 wt %, preferably 81 wt % to 87 wt %, of the weight of the filtration media and a resin binder preferably comprising a phenolic resin binder with a crosslinking agent and having a weight percentage of 8 wt % to 30 wt %, preferably 13 wt % to 19 wt %, of the weight of the filtration media.

The blend of fibers in the filtration media comprises cellulose fibers having a weight percentage of about 80 wt % to 100 wt %, preferably about 82.5 wt % to about 96 wt %, of the weight of the blend of fibers and synthetic fibers having a weight percent of 0 wt % to 20 wt %, preferably about 4 wt % to about 17.5 wt % of the weight of the blend of fibers. The cellulose fiber component of the blend of fibers comprises curled softwood pulp having a weight percentage of about 50 wt % to about 100 wt % of the weight of the cellulose component of the blend of fibers and hardwood pulp having a weight percentage of no more than 50 wt % of the cellulose component of the blend of fibers. The curled softwood pulp is of a type that when formed into a 60 lb/3000 sq. ft (98 gm/m$^2$) handsheet with a caliper of 16-26 mils (0.41-0.66 mm), more preferably between 16-23 mils (0.41-0.66 mm), the handsheet has an air permeability of 100-175 cfm (508-889 l/m$^2$s). The synthetic fibers are preferably polyester fibers having a denier of 1 to 3 and a length of ¼ to ½ inch (6.35-12.7 mm).

The filtration media can be produced with conventional wet-laid papermaking equipment, including but not limited to those having an inclined wire, flat fourdrinier wire, twin wire or rotoformer, to dewater a fiber furnish and form a wet web, and additional processing including heating, cooling, application of the resin binder, then curing. In accordance with the methods disclosed herein, a fiber furnish is formed having a fiber composition of 80 wt % to 100 wt %, preferably 80 wt % to 95 wt %, cellulose fibers and 0 wt % to 20 wt %, preferably 5 wt % to 20 wt %, synthetic fibers. The cellulose fiber content of the fiber furnish comprises at least 50 wt % curled softwood pulp of a type that when only the softwood pulp is formed into a 60 pounds per 3,000 square feet (98 g/m$^2$) handsheet with a caliper of 16-26 mils (0.41-0.66 mm), the handsheet has an air permeability of 100-175 cfm (508-889 l/m$^2$s). The cellulose fibers in the fiber furnish further comprise no more than 50 wt % hardwood pulp, preferably 20 wt % to 50 wt % in the cellulose component of the blend of fibers. The fibers in the fiber furnish may be mechanically abraded to induce fibrillation. The fiber furnish is diluted to have a solids content of 0.05 wt % to 0.3 wt %, preferably 0.05 wt % to 0.2 wt %, and sprayed onto a paper machine to form a web. The web is dried to form a dry sheet and a resin binder formulation is applied to the dry sheet in the amount of 8 wt %-30 wt %, preferably 13 wt %-19 wt % by weight of the sheet. The resin binder formulation is preferably a phenolic resin binder with a crosslinking agent. The sheet is then dried and cured to a desired state of cure that is less than a state of full cure.

Additional fibers and materials may be added to the media or substituted for the fibers and materials disclosed above to impart other properties. Other objects, features and advantages of the present disclosure and the present invention will be apparent when the detailed description of preferred embodiments is considered in conjunction with the following drawings.

BRIEF DESCRIPTION OF DRAWINGS

FIG. 1 is a process flow diagram for production of a filtration media.

DETAILED DESCRIPTION OF PREFERRED EMBODIMENTS

The filtration media produced by the methods described herein exhibits the desired characteristics of improved filtration, strength, tear resistance and air permeability in the form of a relatively thin and lightweight wet-laid fibrous web that may or may not be cured in a subsequent step having a wet Mullen ratio of 20% to 90%, preferably 30% to 80%, more preferably 60% to 80% to ensure that the media is flexible enough to be formed into a fluted structure, and has thermoformability and strength to retain the fluted structure when wound into a roll and to permit further processing. The filtration media may therefore be used in a wide variety of filtration elements, including z-flow elements that require fluted media, laminar flow filter elements, and any other application that requires a thin, partially cured media.

The term "wet Mullen ratio" is used to indicate the curing level of the media that is needed to maintain the shape of a fluted or corrugated or pleated structure, and still have the flexibility to be further wrapped around a core and assembled into a filter element or cartridge. The wet Mullen ratio of the media formed by the present disclosure (which is partially cured to a desired state of cure less than full cure) is calculated by dividing the wet Mullen burst strength of a sample of the partially cured media as formed by the wet Mullen burst strength of a sample of the media that has been fully cured in an oven for 5 minutes at 350° F. (177° C.), and then multiplying by 100 to determine a percentage. The fully cured sample of the filtration media will exhibit the highest wet Mullen burst strength that the sample is capable of exhibiting.

Wet Mullen burst strength indicates the pressure required for puncturing a fiber web and the web's capacity for load carrying. In this test, samples are cut to at least 2.5×2.5 inches (64×64 mm), saturated with water having a concentration of non-ionic surfactant in the amount of approximately 0.03 wt %, clamped into a circular diaphragm of a Mullen Bursting tester and the wet bursting strength is measured according to the Technical Association of the Pulp and Paper Industry ("TAPPI") Standard T 403 om-02 ("Bursting Strength of Paper").

It is desired that filtration media produced in accordance with this disclosure that may or may not be cured in a subsequent step have a wet Mullen ratio between 20% and 90%, preferably between 30% and 80%, more preferably between about 60% and about 80%, and most preferably 70%. It has been found that the stiffness of media having a wet Mullen ratio lower than 60% is too low for those applications where further curing is not desired, and therefore not capable of retaining a fluted or corrugated or pleated structure. It has been further determined that when the wet Mullen ratio is higher than about 75%, the media starts to become brittle, such that proper fluted or corrugated or pleated structures cannot be formed without cracking and/or tearing media unless the media is re-moisturized. However, if the customer/downstream converter is able to use pre-heating and/or re-moisturizing to pleat or flute the media, the wet Mullen ratio may range anywhere between 20% and 90%. The processing parameters and media composition described below are selected to achieve the desired state of cure in the media where no additional curing is required, as determined by the wet Mullen ratio.

The filtration media is constructed to be relatively thin, to permit dense packing within filtration elements and desirable flute formation properties. The caliper or thickness of the media is determined according to TAPPI Standard T 411-om-05 using a Thwing Albert 89-100 Thickness Tester. A suitable thickness for the disclosed thin filtration media is on average 6 mils to 15 mils (0.15-0.38 mm), preferably 8 mils to 15 mils (0.20-0.38 mm) and more preferably about 10 mils to 12 mils (0.25-0.30 mm).

The filtration media is also constructed to have a relatively low basis weight. The basis weight is measured according to TAPPI Standard T 410-om-02. A suitable basis weight of the media is below 60 pounds per 3000 square feet (97.7 g/m$^2$), preferably between 31 and 49 pounds per 3000 square feet (lbs/3000 ft$^2$) (51-80 g/m$^2$), more preferably between 35 and 45 lbs/3000 ft$^2$ (57-73 g/m$^2$), and most preferably between 39 and 43 lbs/3000 ft$^2$ (63-70 g/m$^2$) measured before curing the media. The basis weight of the media after it has been fully cured decreases approximately 2 to 4 lbs/3000 ft$^2$ (3.3-6.5 g/m$^2$).

In order to provide a relatively low resistance to air flow, it is desirable that the filtration media have a relatively high air permeability (or "air perm"). The air perm of the filtration media is measured according to TAPPI Standard T 251 cm-85 ("Air Permeability of Porous Paper, Fabric and Pulp Handsheets") with 0.5 inch (12.7 mm) water differential, which measures the rate of the flow of air in cubic feet per square foot of sample area per minute (ft$^3$/ft$^2$ min) sometimes referred to as mere cfm. Air perm may also be referred to as porosity, Frazier or Textest. It is desirable for the filtration media to have an air perm of at least 20 cubic feet per minute per square foot (cfm/sf) (101.6 l/m$^2$s), and preferably at least 25 cfm/sf (127 l/m$^2$s).

The filtration media is also constructed to have relatively high tear strength to withstand tears that may occur as a result of vibrations during use in a filter element. Tear strength of the filtration media is determined according to TAPPI Standard T 414 om-04 ("Internal Tearing Resistance of Paper; Elmendorf-Type Method") using an Elmendorf Tearing Tester (Thwing-Albert Instrument Co., Philadelphia, Pa.) with a 100 gram pendulum. Higher values represent stronger substrates. The filtration media should have a tear strength in the machine direction (MD) of at least 50 grams-force (490 mN) per 16-ply and a tear strength in the cross direction (CD) of at least 60 grams-force (590 mN) per 16-ply and, preferably more than 65 grams-force (640 mN) per 16-ply in the MD and more than 85 grams-force (830 mN) per 16-ply in the CD.

The fiber composition and processing parameters are selected to provide a filtration media that is thin, as described above, but is not compact. It is desirable for the filtration media to have open spaces or pores of sufficient size to permit fluid flow through the media, but not to degrade the filtration media's dust holding capacity. The size of the pores is determined using a bubble point method according to ASTM 316-03 (2011). The test is based on the fact that the pressure required to force an air bubble through a pore is inversely proportional to the size of the hole. The filter media is placed in contact with liquid on the upper surface and air beneath. Air pressure is gradually increased until it is high enough for bubbles to be seen on the liquid side. The pressure at which the bubbles begin to flow determines the largest pore size, as well as location. The maximum pore size in the media (or "Max Pore") may be between 43 microns (μm) and 63 microns. The average pore size (or "Mean Flow Pore") is based on comparison of the gas pressure, either air or nitrogen, through a dry sample to that of one wetted with mineral oil also according to ASTM 316-03 (2011). A suitable MFP is between 10 microns (μm) and 20 microns.

It is desirable for the filtration media of this disclosure to have a pressure drop of less than 1000 Pa for dust loading of 1.5 mg/cm$^2$ when testing a flat single layer of the media having a 100 cm$^2$ sample area with SAE fine dust (ISO 12103-1A2 Fine Test Dust from Powder Technologies, Inc.) at a concentration of 150 mg/m$^3$ and a face velocity of 20 cm/sec. The pressure drop across the filtration media is measured using a Palas MFP-30000 Filter Test System (Palas GmbH, Karlsruhe, Germany) connected to a RBG 1000 dust feeder. It is also desirable for a filtration element containing the filtration media that has been pleated and/or fluted to have a pressure drop of less than 350 Pa for dust loading of 30 mg/cm$^2$ when testing with SAE fine dust (ISO 12103-1A2 Fine Test Dust from Powder Technologies, Inc.) at a concentration of 200 mg/m$^3$ and a face velocity of 5 cm/sec.

It is also desirable for the filtration media to have particle removal efficiency of no less than 20 percent for 0.78 micron (μm) latex particles at a face velocity of 20 feet/minute (6.1 m/min or 0.1 m/s) when tested according to ASTM-1215-89.

The filtration media comprises a blend of fibers having a weight percent of 70% to 92%, preferably 81% to 87% of a weight of the media and a resin binder having a weight percent of 8% to 30%, preferably 13% to 19% (more preferably about 16%), of the weight of the filtration media. The resin binder preferably comprises a phenolic resin binder with a crosslinking agent, such as a methanol soluble resole phenolic or methylated melamine formaldehyde. Other suitable resins include epoxies, novalac, acrylic, styrene acrylic, vinylacrylic, ethylenevinylchloride, polyvinylacetate, urea formaldehyde, ethylenevinylacetate, polyvinylalcohol, DMDHEU (dimethylol dihydroxyethyleneurea) and isocyanate.

The softwood pulp in the filtration media has a weight of about 28 wt % to 92 wt %, preferably 32 wt % to 66 wt %, of the weight of the media. The hardwood pulp in the filtration media has a weight of about 0-46 wt %, preferable 13 wt % to 41 wt %, of the weight of the media. Synthetic fibers in the filtration media have a weight of about 0-18.4 wt %, preferably 3.2 wt % to 15.2 wt % of the weight of the media. The cellulose content is 56 wt % to 92 wt %, preferably 66.8 wt % to 83.5 wt %, of the weight of the media.

The composition of the blend of fibers in the filtration media comprises cellulose fibers having a weight percentage of about 80 wt % to 100 wt %, preferably about 82.5 wt % to about 96 wt %, of the weight of the blend of fibers and synthetic fibers having a weight percent of about 0 wt % to about 20 wt %, preferably about 4 wt % to about 17.5 wt %, of the weight of the blend of fibers.

The cellulose fiber component of the blend of fibers comprises a blend of hardwood and softwood pulp. The hardwood pulp has a weight percentage of no more than 50 wt %, preferably about 13 wt % to about 41 wt %, of the weight of the media, and is preferably *Eucalyptus*. Other suitable hardwood pulps include aspen, birch, poplar, oak and maple.

The softwood pulp in the cellulose component of the blend of fibers has a weight percentage of about 50 wt % to about 100 wt % of the weight of the cellulose component of the blend fibers. Suitable softwood pulp is derived from the wood of pine, cedar, alpine fir, douglas fir and spruce trees, but preferably is slash pine or loblolly pine. The softwood pulp is generally mechanically or chemically treated to achieve a high level of curling to provide high air permeability and high capacity properties to the filtration media. The thus curled softwood cellulose pulp provides a more open lofty web structure than untreated cellulose fibers because it does not pack down as much during web formation, and permits production of a thin web even after refining, while retaining an open structure and high permeability of at least 20 cfm (101.6 l/m$^2$s), preferably at least 25 cfm (127 l/m$^2$s). A suitable mechanically and/or chemically curled softwood pulp is of a type that when formed into a 60 pounds per 3,000 square feet (97.7 g/m$^2$) handsheet with a caliper of between 16 and 26 mils (0.41-0.66 mm), preferably 16 and 23 mils (0.41-0.58 mm), more preferably between 17 and 23 mils (0.43-0.58 m), the handsheet has an air permeability of 100-175 cubic feet per minute (cfm) (508-889 l/m$^2$s). The handsheet is prepared according to a modified version of TAPPI Standard T 205 om-88 ("Forming Handsheets for Physical Tests of Pulp") by disintegrating 6.4 grams of bone dry curled softwood pulp in 2000 milliliters of water to achieve a furnish with 0.32% solids consistency. The furnish is processed in a disintegrator for 5 minutes at 300 revolutions per minutes (rpm), and put into a sheet mold to form a handsheet having a basis weight of 60 pounds per 3000 square feet (97.7 g/m$^2$). The caliper of the handsheet is determined according to TAPPI Standard 411-om-05 as set forth above. An example of a type of softwood cellulose pulp suitable for use in the filtration media of this disclosure is a bulk-dried southern bleached softwood kraft (SBSK) pulp made from essentially 100% Slash Pine fibers, available from Georgia Pacific, Atlanta Ga. (formerly Buckeye Technologies, Memphis, Tenn.) as Grade FHP-11.

Synthetic fibers are incorporated into the blend of fibers to provide strength and tear resistance properties. Preferred synthetic fibers are polyester fibers (e.g., polyethylene terephthalate or PET) having a linear density of 1 to 3 denier (i.e., the weight in grams of 9,000 meters of fiber), preferably 1.5 denier, and a length of ¼ to ½ inch (6.35-12.7 mm), preferably ⅜ inch (9.53 mm). Other suitable synthetic fibers include polyamide, polybutylene terephthalate, polypropylene, polyethylene.

A flow diagram for a suitable process for producing filtration media that exhibit the desired characteristics described above is shown in FIG. 1. In general, a wet-laid process is employed to form a wet web of a desired fiber composition for further processing that may include heating, cooling, application of a resin formulation and curing.

In the process, a fiber furnish is prepared by filling a hydropulper 12 with water, agitating the water, adding a blend of hardwood and softwood cellulose fibers and synthetic fibers, and further agitating the mixture for approximately 2 to 20 minutes to mix and disperse the fibers, such that the fiber furnish has a consistency of approximately 3.5% solids. The fiber furnish preferably comprises 80 wt % to 100 wt % cellulose fibers and 0 wt % to 20 wt % synthetic fibers, preferably 10 wt % synthetic fibers. The cellulose fiber content in the fiber furnish is preferably 50 wt % to 80 wt % curled softwood pulp and 20 wt % to 50 wt % hardwood pulp.

The fiber furnish is sent to refiners, such as disk and conical refiners, where the fibers are mechanically abraded to induce fibrillation, to reduce the caliper of the web formed from the furnish, and to achieve desired permeability. The refining process typically results in internal fibrillation, external fibrillation, fiber shortening, and fines formation. It also typically results in a denser and less porous sheet. However, it has been determined that by controlling the amount of energy and intensity in the refiner, the softwood pulp disclosed herein retains an open structure even after refining, and therefore provides a high capacity filter media with high air permeability. The energy applied in the refiners varies based upon the desired level of fibrillation, permeability, tensile strength and caliper. For example overrefining may result in reduced air permeability, and reduced caliper, while under-refining may produce a sheet that does not have enough tensile strength. The tensile strength of a fiber web formed from the refined fiber furnish (before further treatments, i.e., a base paper) should have a tensile strength in the machine direction of about 9-15.5 lb/in (1.6-2.7 kN/m) and in the cross direction of about 5.7-9.2 lb/in (1.0-1.6 kN/m), measured by TAPPI Standard T 494 om-01 ("Tensile Properties of Paper and Paperboard (using constant rate of elongation apparatus)"). The air permeability of the base paper should have air permeability of about 32-36 cfm/sf (163-183 l/m$^2$s) as measured by TAPPI Standard 251 cm-85. A suitable refining load, or energy, to achieve the properties of the media disclosed herein range from 3.9 to 5.0 horsepower day per tonne (HPD/T) (0.12-0.16 kWh/T). Tonne is a metric ton (2204.6 pounds).

The fiber furnish is then transported to a fan pump 14 where the suspension is diluted with water to a desired consistency ranging from about 0.05 to 0.3 wt % depending upon the type of paper machine forming technology that is used, to form a fiber furnish. When the fiber furnish is sufficiently mixed and diluted, it is transported to a headbox 16 for delivery to a wire forming line on a web-forming machine 18 by spraying or otherwise to form a web or sheet. The web or sheet may be produced by any conventional wet-laid paper machines, including those having forming sections selected from the group consisting of inclined wire, twin wire, flat fourdrinier wire and rotoformer. Water is removed from the web or sheet by vacuum slots placed along the length of the wire forming line, such that the water content of the web as it comes off the wire is about 75 wt %, i.e., the solids content is approximately 25 wt %.

After the web is formed from the fiber blend and dewatered, the formed web is transferred to a drying section that may include cylinder driers or a perforated drum called a through air dryer (TAD) 20 to further remove water, such that the solids content is approximately 50 wt %. The web is then transferred to a series of dryer cans (or steam cylinders) 22 arranged in a serpentine manner for further drying of the web until the moisture content is about 1-2 wt %. The dried web is then wound up on a reel 24 for storage or further processing. Alternatively, further processing may be set up in-line with the web formation machinery.

The wound reel 24 of dried web may then be transported to a separate line for further processing, as shown in FIG. 1. The web is unwound from reel 24 and transferred to a saturator 26 where a resin binder formulation is applied to both sides of the web. A saturating size press or other conventional means may be used to apply the resin formulation, such as curtain coaters, metered press coater, foam bonders, gravure rolls, dip and nip, doctored transfer rolls, rod coaters, and spray coaters. In general, the size press or coater will create hydraulic pressure that presses the resin formulation into the web.

Preferred resin formulations include a phenolic resin binder with a cross-linking agent, such as a methanol soluble resole phenolic or methylated melamine formaldehyde, dispersed in a carrier of methanol or other type of liquid solvent or dispersant. The resin formulation may include a small amount of water, but not as a carrier. The resin formulation has a solids content of about 18 wt %, but resin formulations having solids contents between 12 wt % and 30 wt % are also be suitable to achieve the desired properties. Flame retardants, such as phosphorous, nitrogen, and halogen compounds, or combinations thereof, may be added to the resin formulation if flame and/or fire retardant properties are desired. Water-repellant compounds, such as fluorocarbons and wax, may also be added to resin formulation if repellency properties are desired.

The resin formulation may be applied as an add-on to the web in an amount equal to about 9-15 grams per square meter. In the exemplary embodiments described below, about 12 grams per square meter of resin was applied. The resin should be applied in an amount that permits the final media to have a resin content of about 8 wt %-30 wt %, preferably 13 wt % to 19 wt % of the weight of the media. The total basis weight of the webs in this disclosure, including the resin binder formulation, will be about 31 to 49 lbs/3000 ft$^2$ (50-80 g/m$^2$), after curing.

The saturated web is then transported to a pre-drying section 28 heated to approximately 190° F. to 220° F. (88-104° C.) to drive off the resin carrier and reduce the moisture content of the web to approximately 0.7 wt %-1.5 wt %. The pre-drying section may consist of steam cans, a through-air dryer, floatation oven, or other known types of dryers.

The web is then transported to a curing station 30 where the resin is advanced to a desired state of cure that is less than fully cured (i.e., a partial cure), such that the web exhibits a wet Mullen ratio of between 20% and 90%, preferably between 30% and 80%, more preferably between 60% and 80%, most preferably 70% (i.e., the wet Mullen ratio is used to measure the desired amount of cure). This permits a manufacturer of filter elements to further process the media without cracking or tearing the media, and complete the cure if necessary. Curing may be accomplished in a forced air oven, or other types of heating devices, such that the temperature of the web as it exits the curing station 30 is between 300° F. and 350° F. (149-177° C.), preferably 305° F. to 335° F. (152-168° C.). Typical curing times to achieve the desired wet Mullen ratio in a media as described above are between about 6 to 10 seconds, and preferably 7-8 seconds. If the media is overcured, it loses its flexibility, becomes brittle and is prone to fracturing during the production of the media. Overcuring may also cause fracturing of the media in subsequent converting processes such as folding, fluting, or pleating during the manufacture of a filter element. The desired amount of cure in the ranges disclosed herein results in the media having good flexibility and adequate tensile strength for processing during production and use, and also for the shape retention property of the media in the filter element. The CD wet tensile targets should preferably be in 7.3-9.1 lb/in (1.3-1.6 kN/m) range.

After the web is dried and cured to the desired state of cure, the web is cooled with chilled cooling cans 32 or other suitable cooling means, to stop the reaction of the resin. The web is then re-moisturized at a fine water spray station 34 to stabilize the web structure and improve subsequent processing, such that the moisture content of the finished web is less than 5% (3 grams/square meter). Other means of re-moisturizing the web may also be used. The web may then be wound on a dry reel or winder 36.

Employing the blend of fibers and processing parameters described above permits tuning filtration media to the desired wet Mullen cure ratio while retaining the desired properties for filtration applications, including providing a thin, light weight media with good tear resistance and air permeability, high capacity air filtration properties, and that is flexible, but strong enough to retain a fluted or other structure when wound in a roll. Table I shows the composition and physical properties of 4 examples of filtration media produced in accordance with the foregoing disclosure (samples 1A-C and 2) that exhibit the desired wet Mullen ratio when no further treatment is required for proper pleating or fluting, and 3 examples of filtration media that exhibit the wet Mullen ratio where further treatment may be required depending on the desired properties of the final product.

TABLE I

| Sample | 1A | 1B | 1C | 2 | 3 | 4 | 5 |
|---|---|---|---|---|---|---|---|
| Fiber Furnish Compositions (wt % of Furnish) | | | | | | | |
| Hardwood Pulp | 30 | 30 | 30 | 30 | 30 | 30 | 30 |
| Softwood Pulp | 60 | 60 | 60 | 60 | 70 | 70 | 60 |
| Polyester | 10 | 10 | 10 | 10 | 0 | 0 | 10 |
| Resin Add-On (wt % of finished media weight) | | | | | | | |
| Phenolic | 19.43 | 16.83 | 11.43 | 13.65 | 16.11 | 15.72 | 15.64 |
| Physical Properties | | | | | | | |
| Basis Wt. (SD) (lbs/3000 ft$^2$) | 43.08 | 42.6 | 39.4 | 40.64 | 41.71 | 41.41 | 41.5 |
| Basis Wt. (SDC) (lbs/3000 ft$^2$) | 39.98 | 38.4 | 35.72 | 38.7 | 39.73 | 39.52 | 39.76 |
| Caliper (mils) | 11.34 | 10.88 | 9.98 | 10.24 | 10.09 | 10.15 | 9.92 |
| Density (SD) (lbs/ft$^3$) | 15.20 | 15.66 | 15.79 | 15.88 | 16.54 | 16.32 | 16.73 |
| Density (SDC) (lbs/ft$^3$) | 14.10 | 14.12 | 14.32 | 15.12 | 15.75 | 15.57 | 16.03 |
| Wet Mullen Ratio (% Cure) | 67.85 | 73.11 | 75.46 | 61.23 | 40.98 | 40 | 31.06 |
| Air Perm (cfm/sf) | 28 | 32 | 28.2 | 29.5 | 28.6 | 28.4 | 27.1 |
| MD Tear Resistance (g) | 68 | 73 | 80 | | 84 | 80 | 80 |
| CD Tear Resistance (g) | 88 | 85 | 96 | | 80 | 80 | 96 |
| Stiffness - Gurley (SD) (mg) | 600 | 800 | 533 | | 450 | 450 | 400 |
| Stiffness/Density (cm$^3$) | 2.464 | 3.189 | 2.107 | | 1.698 | 1.721 | 1.493 |
| Mean Flow Pore (microns) | 13.9 | 16.8 | 14.5 | 16.9 | 13.3 | 13.8 | 14 |
| (SI units) | | | | | | | |
| Fiber Furnish Compositions (wt % of Furnish) | | | | | | | |
| Hardwood Pulp | 30 | 30 | 30 | 30 | 30 | 30 | 30 |
| Softwood Pulp | 60 | 60 | 60 | 60 | 70 | 70 | 60 |
| Polyester | 10 | 10 | 10 | 10 | 0 | 0 | 10 |
| Resin Add-On (wt % of finished media weight) | | | | | | | |
| Phenolic | 19.43 | 16.83 | 11.43 | 13.65 | 16.11 | 15.72 | 15.64 |
| Physical Properties | | | | | | | |
| Basis Wt. (SD) g/m$^2$ | 70.11 | 69.33 | 64.12 | 66.14 | 67.88 | 67.39 | 67.54 |
| Basis Wt. (SDC) g/m$^2$ | 65.07 | 62.50 | 58.13 | 62.98 | 64.66 | 64.32 | 64.71 |
| Caliper (mm) | 0.288 | 0.276 | 0.253 | 0.260 | 0.256 | 0.258 | 0.252 |
| Density (SD) (kg/m$^3$) | 243.48 | 250.85 | 252.93 | 254.37 | 264.95 | 261.42 | 267.99 |
| Density (SDC) (kg/m$^3$) | 225.86 | 226.18 | 229.38 | 242.20 | 252.29 | 247.41 | 256.78 |
| Wet Mullen Ratio (% Cure) | 67.85 | 73.11 | 75.46 | 61.23 | 40.98 | 40 | 31.06 |
| Air Perm ((l/m$^2$s) | 142 | 163 | 143 | 150 | 145 | 144 | 138 |
| MD Tear Resistance (g) | 68 | 73 | 80 | | 84 | 80 | 80 |
| CD Tear Resistance (g) | 88 | 85 | 96 | | 80 | 80 | 96 |
| Stiffness - Gurley (SD) (mg) | 600 | 800 | 533 | | 450 | 450 | 400 |
| Stiffness/Density (cm$^3$) | 2.464 | 3.189 | 2.107 | | 1.698 | 1.721 | 1.493 |

TABLE I-continued

| Sample | 1A | 1B | 1C | 2 | 3 | 4 | 5 |
|---|---|---|---|---|---|---|---|
| Mean Flow Pore (microns) | 13.9 | 16.8 | 14.5 | 16.9 | 13.3 | 13.8 | 14 |

The physical properties set forth in Table I were measured using the test methods described above. The term "SD" in Table I refers to the filtration media after it is saturated and dried to the desired cure level (i.e., partially cured). The term "SDC" refers to the filtration media after it has been fully cured by heating it an oven for an additional 5 minutes at a temperature of 350° F. (177° C.).

As shown in Table I, filtration media produced in accordance with the present disclosure was made to have the desired wet Mullen ratio in the range of 60% to 80% (i.e., the desired state of cure) without sacrificing any of the filtration or strength properties of the media. The wet Mullen ratios of Samples 3-5 were below the desired state of cure and resulted in the media's stiffness being so low that it requires further processing before processing and use in fluted media applications.

The ratio of the media's stiffness (mg) to density (lb/ft3) (kg/m$^3$) is another indication of the improved flexibility achieved by the disclosed filtration media having a wet Mullen ratio in the range of 60% to 80%, which permits it to be flexible enough for processing in fluted media applications but strong enough to retain a fluted structure and permit further processing. The ratio of stiffness to density for the partially cured media (SD) was calculated and divided by a factor of 15.4 to simplify to SI units of cm$^3$. The stiffness of the as formed/partially cured (SD=saturated and dried) media was determined by its resistance to bending according to modified TAPPI Standard T 543 om-05 ("Bending resistance of paper (Gurley-type tester)"). Samples were cut 3.5" (88.9 mm) in the machine direction by 2" (50.8 mm) in the cross direction, then clamped in the Gurley stiffness tester (Model No. 4171E) and tested using a 25 g weight that is 4" (101.6 mm) from the pivot center. Data reported are averages of three samples. The density was calculated by dividing the basis weight by the caliper and multiplying by 4. As shown in Table I, samples 1A-1C and 2, with wet Mullen ratios in the desired range, have higher stiffness to density ratios than the samples with wet Mullen ratios below the desired range that would require further processing for pleating application.

The above disclosure, embodiments and examples are illustrative only and should not be interpreted as limiting. Modifications and other embodiments will be apparent to those skilled in the art, and all such modifications and other embodiments are intended to be within the scope of the present invention as defined by the claims.

We claim:

1. A method of making a filtration media, comprising the steps of:
    forming a fiber furnish having a fiber composition of 80-100 wt % cellulose fibers and 0-20 wt % synthetic fibers, the cellulose fibers comprising at least 50 wt % curled softwood pulp of a type that a 60 pounds per 3,000 square feet (98 g/m2) handsheet made exclusively from the curled softwood pulp has a caliper of 16-26 mils (0.41-0.66 mm), and an air permeability of 100-175 cfm (508-8891/m$^2$s);
    diluting the fiber furnish;
    refining the fiber furnish to induce fibrillation of the softwood fibers;
    forming a fiber web on a paper machine from the fiber furnish;
    drying the wet web to form a dry sheet;
    applying a resin binder to the dry sheet to form a saturated sheet; and
    curing the resin in the saturated sheet to form a cured sheet having a wet Mullen ratio of 20% to 90%, a caliper of about 6 to 15 mils (0.15 to 0.38 mm), and an air permeability of at least 20 cfm (101.61/m$^2$s).

2. The method as recited in claim 1, wherein the step of forming a fiber web comprises applying the fiber furnish onto the paper machine to form a wet web.

3. The method as recited in claim 2, wherein the paper machine is selected from the group consisting of an inclined wire, flat fourdrinier wire and rotoformer to dewater the fiber furnish and to form the wet web.

4. The method as recited in claim 2, further comprising dewatering the wet web in the paper machine such that the wet web has a solids content of about 25% as it exits the paper machine.

5. The method as recited in claim 1, wherein the resin binder is applied to the dry sheet in the amount of 8%-30%, preferably 13%-19% by weight of the dry sheet to form a saturated sheet.

6. The method as recited in claim 1, further comprising pre-drying the saturated sheet prior to the curing step.

7. The method as recited in claim 6, wherein the saturated sheet is pre-dried at temperatures ranging from approximately 190° F. to 220° F. (88-104° C.).

8. The method as recited in claim 1, wherein the cellulose fibers in the fiber furnish comprise hardwood pulp in a range of 0-50 wt %, preferably 20-50 wt %, of the cellulose component of blend of fibers in the furnish.

9. The method as recited in claim 1, wherein the resin binder is a phenolic resin binder with a crosslinking agent.

10. The method as recited in claim 1, wherein the synthetic fibers in the fiber furnish comprise polyester fibers having a denier of 1 to 3 and a length of ¼ to ½ inch (6.35-12.7 mm).

11. The method as recited in claim 1, wherein refining the fiber furnish comprises mechanically abrading the fibers in the fiber furnish.

12. The method as recited in claim 1, wherein the fiber furnish is diluted to have a solids content of 0.05 to 0.3%.

13. The method as recited in claim 1, wherein the wet web is dried such that the dry sheet has a moisture content of about 1-2%.

14. The method as recited in claim 1, wherein the resin is applied to the dry sheet in an amount equal to about 9-15 grams per square meter.

15. The method as recited in claim 1, wherein the saturated sheet is dried to reduce moisture content in the saturated sheet to about 0.7 wt % to 1.5 wt %.

16. The method as recited in claim 1, wherein the curing step comprises heating the saturated sheet for about 6 to 10 seconds, such that the cured sheet has a temperature between 300° F. and 350° F. (149-177° C.).

17. The method as recited in claim 1, further comprising cooling the cured sheet to stop the reaction of the resin.

18. The method as recited in claim 1, further comprising re-moisturizing the cured sheet to have a moisture content of less than 5 wt %.

19. The method as recited in claim 1, wherein the cellulose fibers in the fiber furnish comprise 0-50 wt %, preferably 20-50 wt %, hardwood pulp, the synthetic fibers in the fiber furnish comprise polyester fibers having a denier of 1 to 3 and a length of ¼ to ½ inch (6.35-12.7 mm) and the resin binder is a phenolic resin binder with a crosslinking agent.

20. The method as recited in claim 1, wherein the resin binder is applied to the fiber web in an amount equal to about 9-15 grams per square meter and cured such that the cured sheet has a temperature between 300° F. and 350° F. (149-177° C.).

21. The method as recited in claim 1, further comprising refining the fiber furnish to induce fibrillation of the fibers in the fiber furnish and reduce the caliper fiber web.

22. The method as recited in claim 1, wherein the cured sheet is cured to have a wet Mullen Ratio of 60-80%.

\* \* \* \* \*